March 17, 1970
R. J. BACON
3,500,619
SECTIONALIZED MOWER
Filed April 24, 1967
4 Sheets-Sheet 1
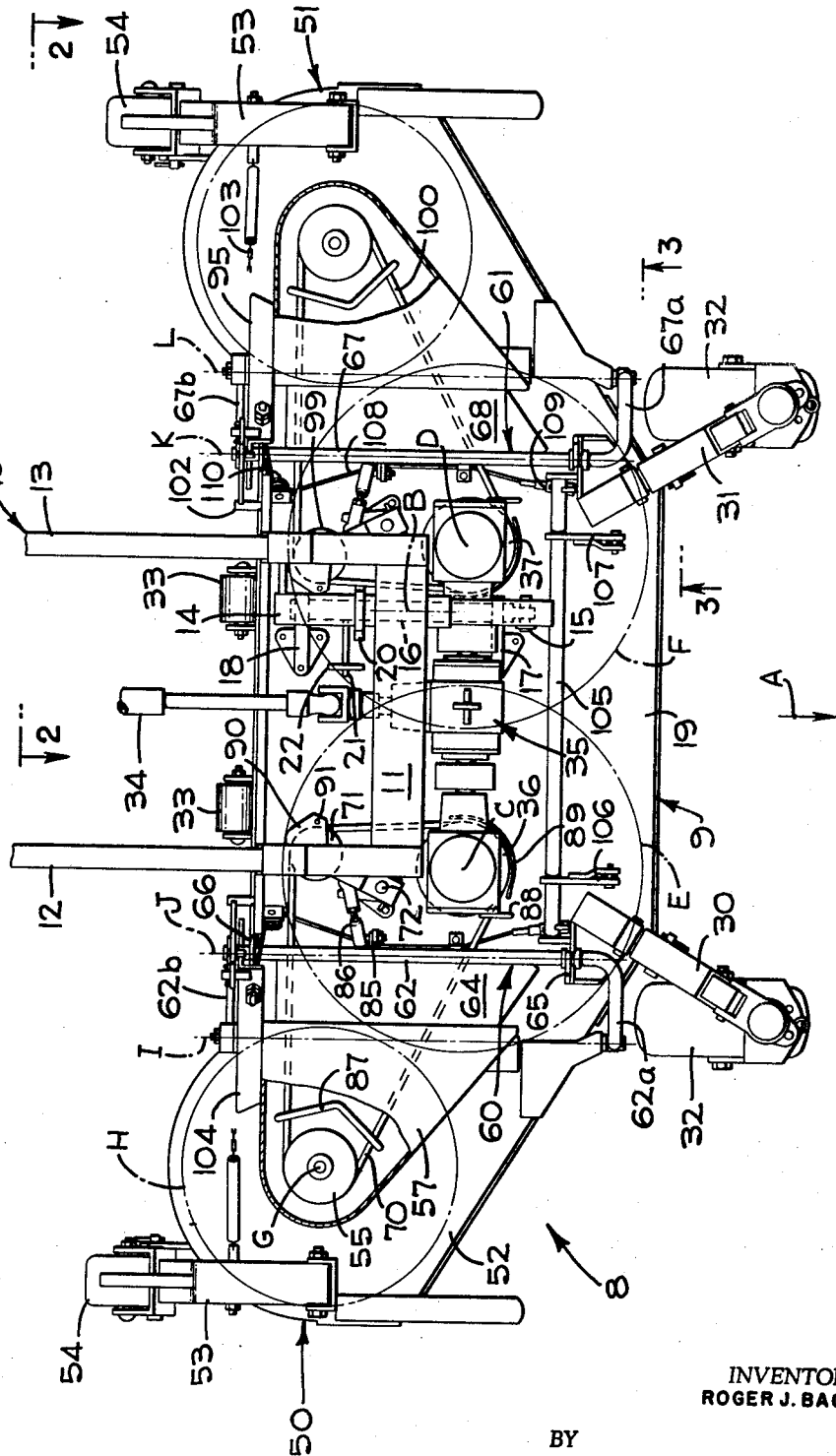
INVENTOR.
ROGER J. BACON
BY
*Francis W. Anderson*
ATTORNEY March 17, 1970     R. J. BACON     3,500,619
SECTIONALIZED MOWER
Filed April 24, 1967     4 Sheets-Sheet 2
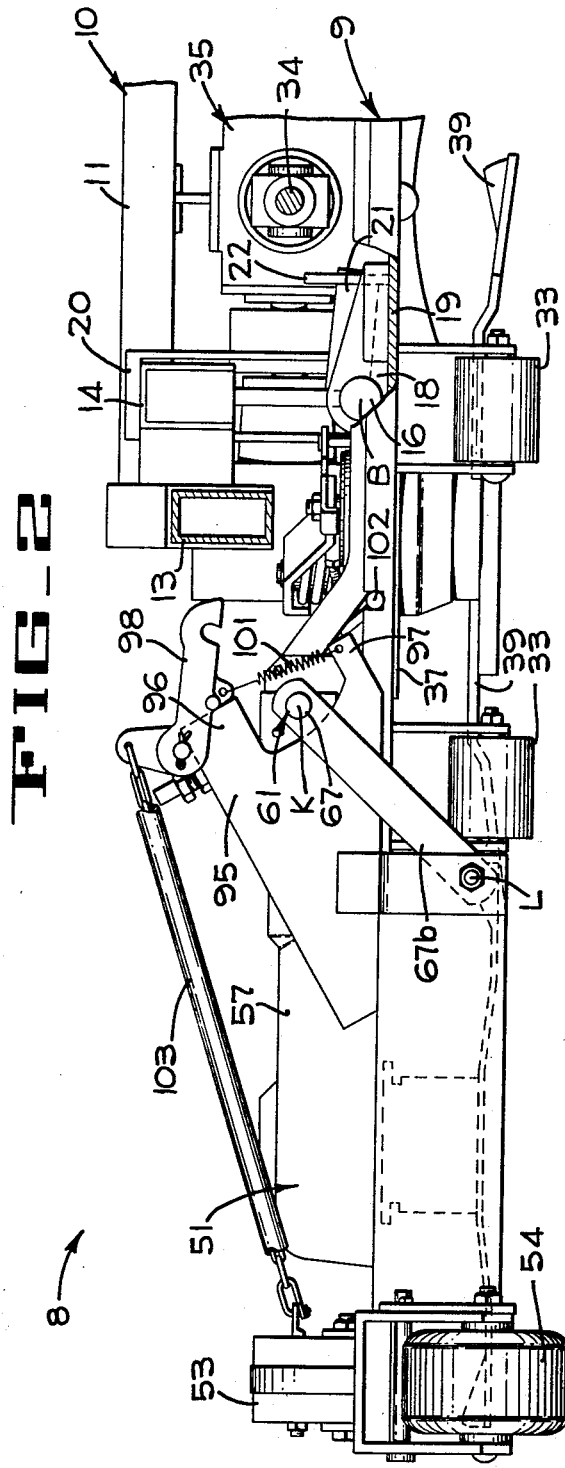
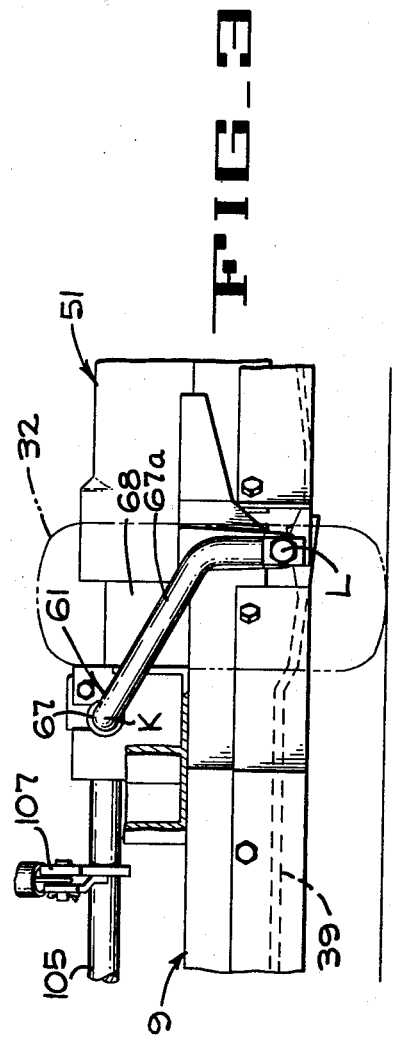
INVENTOR.
ROGER J. BACON
BY
*Francis W. Anderson*
ATTORNEY March 17, 1970 R. J. BACON 3,500,619
SECTIONALIZED MOWER
Filed April 24, 1967 4 Sheets-Sheet 3
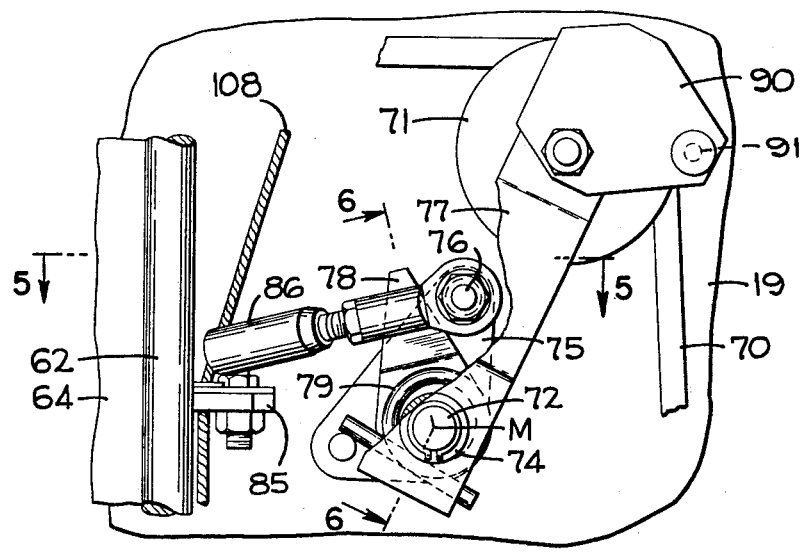
FIG_4
FIG_5
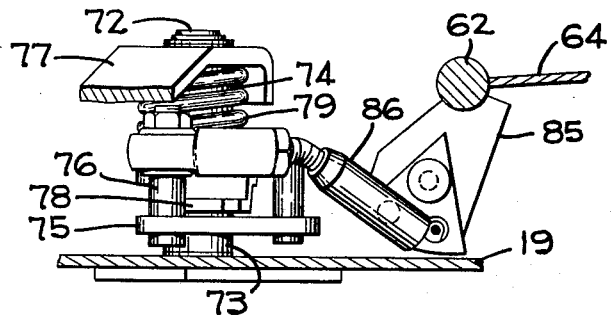
FIG_6
INVENTOR.
ROGER J. BACON
BY
Francis W. Anderson
ATTORNEY

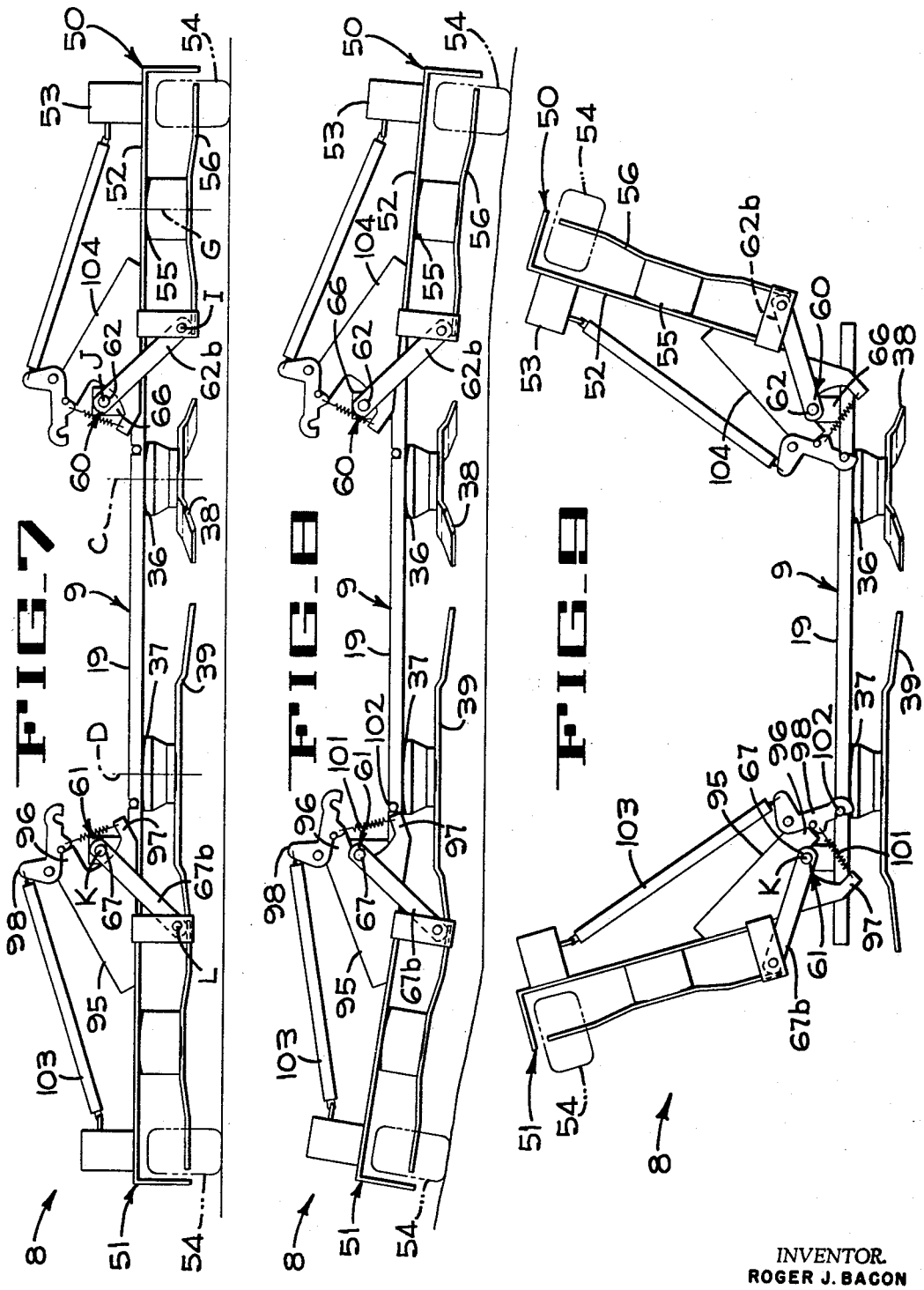

United States Patent Office

3,500,619
Patented Mar. 17, 1970

3,500,619
SECTIONALIZED MOWER
Roger J. Bacon, Port Washington, Wis., assignor to FMC Corporation, San Jose, Calif., a corporation of Delaware
Filed Apr. 24, 1967, Ser. No. 633,217
Int. Cl. A01d 75/30, 35/26
U.S. Cl. 56—6   18 Claims

ABSTRACT OF THE DISCLOSURE

A grass mower attached to the front of a tractor has a central section and side wing sections, the sections having rotary blades normally in a common plane. Each wing section is connected to the central section by an intermediate connecting member and swings, initially, relative to the connecting member, about a pivot axis in the plane of the blades. Thereafter, the wing section swings with the connecting member about a different pivot axis. When swinging movement occurs about this latter pivot axis, a spring biased idler pulley, over which the belt drive to the wing blade runs, is pivoted to interrupt the drive to the wing blade.

DISCLOSURE

The present invention relates to grass mowers, and, more particularly, to rotary grass mowers having more than a single section.

Many types of sectionalized mowers have a main, or central, section to which a side, or wing, section is pivotally attached. Usually, both sections have wheels and, during normal mowing operations, the sections pivot with respect to each other a limited amount as the wheels follow the undulations on the ground. In some types of mowers, the wing sections can be raised and latched in the raised position for storage or for transport in a confined space. The blade in the wing section must be driven when the wing section pivots during mowing, but it is desirable to stop the blade when the wing section is raised for storage or transport.

In the present invention, mechanism is provided which automatically stops the blade of the wing section when the wing section is raised to an elevated position for storage or transport, but which in no way interferes with the drive of the wing section blade as the wing section pivots with respect to the central section during mowing because of normal undulations in the ground.

In the preferred form of the present invention, the central section is not connected directly to the wing section but, instead, is connected to an intermediate member on a first pivot axis, and the intermediate member is connected to the wing section on a second pivot axis. A belt, which passes over an idler pulley mounted on the central section, extends between a source of power mounted on the central section and the blade mounted on the wing section. During normal mowing activity, the wing section pivots with respect to the intermediate member, about the second pivot axis, and the belt conveys power to the blade without diminution.

To store the mower, the wing section (or sections) is manually swung up relative to the central section and latched in a raised position. A bracket on the wing section extends toward the first pivot axis, and when the wing section is swung beyond a predetermined extent the bracket contacts a pivot shaft mounted on the central section in the first pivot axis. Accordingly, further lifting of the wing section causes the wing section and intermediate section to pivot as a unit about the first pivot axis. When this occurs, the pivot shaft, which forms a part of the intermediate member and rotates therewith, swings an arm thereon to swing the idler pulley and loosen the belt leading to the wing section blade. Thus, although the power source continues to operate, the drive to the wing section blade is automatically interrupted.

The central section has a rotary blade which lies in a common horizontal plane with the blade in the wing section (when both sections are on level ground). Preferably, the second pivot axis, which extends horizontally in the direction of travel of the mower (when the mower is running straight), lies in the plane of the blades and extends between the axes of rotation of the blades of the wing and central sections, respectively. Thus, when during normal mowing operation, there is relative pivoting between the sections, the blades will not swing toward or away from each other, leaving swaths of uncut grass, nor will the blade dip toward the ground to scalp certain areas.

It is therefore one object of the present invention to provide a rotary grass mower with mechanism automatically to interrupt power to a section blade when that section is tilted beyond a predetermined point. It is another object of the present invention to provide a mower in which power is supplied to a wing section blade undiminished and without interference during normal mowing operations, the mower having mechanism automatically to interrupt power to a blade in a wing section when the wing section is tilted beyond a certain angle, as for storage or transport. It is yet another object of the present invention to provide a mower with two sections which are tiltable with respect to each other about an axis in the plane of the blades during normal mowing and about a different axis for storage or transport.

In the drawings:

FIGURE 1 is a plan view with portion broken away of a grass mower embodying the present invention;

FIGURE 2 is a fragmentary rear elevation view with portion broken away and partly in section of the mower taken on the lines 2—2 of FIGURE 1;

FIGURE 3 is a fragmentary front view in elevation of the mower taken on the lines 3—3 of FIGURE 1;

FIGURE 4 is an enlarged view of one of the idler pulleys and the actuating mechanism therefor;

FIGURE 5 is a view taken on the line 5—5 of FIGURE 4;

FIGURE 6 is a view taken on the line 6—6 of FIGURE 4;

FIGURE 7 is a somewhat schematic rear view in elevation of the mower during mowing operations on level ground;

FIGURE 8 is a view similar to FIGURE 7 except that the mower is shown on undulating ground during mowing operations;

FIGURE 9 is a view similar to FIGURES 7 and 8 except that the mower is shown with the wing section raised and latched for storage.

There is shown in FIGURE 1 a pusher frame 10 having a cross bar 11 at its forward end and having two side bars 12 and 13 extending rearwardly from the cross bar. The rear end of the side bars 12 and 13 are pivotally connected to a tractor (not shown) which drives the pusher frame 10, and a mower 8 connected thereto, forwardly, as indicated by arrow A. A longitudinal frame member 14 secured to the cross bar 11 is pivotally connected at 15 to shaft 16. The shaft 16 is journaled in brackets 17 and 18 which are secured to base member 19 of the center section 9 of the mower 8. A hanger 20 is secured to the upper surface of base member 19 and straddles frame member 14. A finger 21, extending laterally from shaft 16 extends into a short slot (not shown) in a plate 22 connected to the upper surface of base member 19. Thus, the center mower section 9 is suspended from frame member 14 (at pivot connection 15 and hanger 20) and can pivot with respect thereto (about axis B f shaft 16) to the limited extent permitted by finger 21.

For clarity, the base member 19 is shown in the drawings without a cover, since the cover would conceal much of the mechanism shown. The base member 19 has two arms 30, 31 extending forwardly from the upper surface thereof, each of which supports a wheel 32. Four rollers 33 are mounted at the rear of the base member 19 on the underside thereof. The wheels 32 normally engage the ground during mowing, but the rollers 33, which support the base member 19 when the mower is detached from the tractor, are used to prevent scalping. A power take-off shaft 34 extends from the tractor to a power train, indicated generally at 35, which is mounted on base member 19 and extends laterally thereon to supply power to two sheaves 36, 37 rotatably mounted in base member 9. The sheaves receive blades 38, 39 for rotation about axes C and D. The blades rotate in overlapping orbits E and F and are synchronized for rotation without interference.

Wing, or side, mower sections 50, 51 respectively, are positioned on each side of the center mower section 9. Since these two wing sections, insofar as the present invention is concerned, are similar in construction (though of opposite hand) elements of one or the other, but not both, will be described. The wing section 50 has a base member 52 with an arm 53 secured to the top of the base member and extending rearwardly therefrom. The arm 53 has a ground engaging wheel 54 rotatably mounted thereon. The wing section 50 has a sheave 55 rotatably mounted in the base member for rotation about axis G. The sheave 55 has a blade 56 connected thereto for rotation in orbit H, which is slightly behind, and spaced outboard of, the orbit E. Although the blade orbits of the wing sections do not overlap the blade orbits of the central section, their staggered positions slightly behind the blade orbits of the central section results in the mower cutting overlapping swaths when the mower is moving straight ahead in the direction indicated by arrow A. The wing section 50 has a cover plate 57 extending over the sheave thereof.

An intermediate connecting member 60, 61 is interposed between the center mower section 9 and each wing section 50, 51, respectively. The member 60 has a shaft 62 the forward end of which has a 90° bend to define an extending arm 62a. The shaft 62 has a bar 62b secured to the rear end thereof to define another arm extending from the shaft in the same direction as the arm 62a at the front of the shaft. The intermediate member has a cover plate 64 welded to the shaft 62 between the extending arms thereof. The cover plate 64 extends under the wing section cover plate 57.

The outer ends of the arms 62a, 62b are pivotally connected to the base member 52 of wing section 50 on a longitudinal pivot axis I extending parallel to the normal direction of travel A of the mower. The shaft 62, which defines a pivot shaft lying in a longitudinal pivot axis J, is rotatably mounted in lugs 65, 66 secured to the upper surface of the base member 19 of the center mower section 9. The axis J is parallel to axis I.

The member 61 is similar in construction to member 60 but of opposite hand. The member 61 has a pivot shaft 67 with extending arms 67a and 67b and a cover plate 68 therebetween. The shaft 67 is mounted on the center mower section in pivot axis K and the outer ends of arms 67a and 67b are pivotally connected to wing mower section 51 on pivot axis L. The axes K and L are both parallel to the normal direction of travel A.

The blades of the wing sections are driven through belts from the power train 35 in similar manner so only the drive to one of the wing sections will be described. A belt 70 is received over sheave 36 of the main, or center, mower section and sheave 55 of the wing section. The belt 70 is also received over an idler pulley 71. As shown in FIGURES 4, 5 and 6, an upstanding post 72 is secured, on axis M, to the upper surface of the base member 19 of the center mower section. Two sleeves 73, 74 are rotatably mounted on the post, one above the other. The lower sleeve 73 has secured thereto and extending therefrom an arm 75 with an upstanding stud 76. the upper sleeve sleeve 74 has a pair of spaced arms 77, 78 secured thereto and extending therefrom. The idler pulley 71 is mounted at the outer end of the arm 77, and the arm 77 is urged by spring 79, received over sleeve 74, toward the belt to maintain the belt taut.

An arm 85 is secured to and extends from shaft 62. An adjustable link 86 is connected between the arm 85 and the stud 76 on arm 75. Thus, when shaft 62 is rotated counterclockwise as viewed in FIGURE 5, the arm 75 swings counterclockwise (as viewed in FIGURE 4) to swing the stud 76 about axis M. When this occurs, the stud 76 will contact arm 78, which extends into the path of stud 76, and arm 78 will swing counterclockwise (as viewed in FIGURE 4) about axis M against the bias of spring 79. Thus, sleeve 74 and arm 77 will rotate about axis M (counterclockwise as viewed in FIGURE 4) to swing idler pulley 71 away from the belt, interrupting the drive to the blade of the wing section. When the pulley is swung oppositely, by spring 79 on reverse rotation of shaft 62, to tighten the belt, the belt will reengage with the wing section mower sheaves and reestablish power rotation thereof.

As shown in FIGURE 1 belt guide 87, connected to the upper surface of wing section base member 52, bridges the belt 70 at sheave 55 and holds the belt in the sheave when the belt is loosened. Belt guide 88 is connected to the upper surface of the base member 19 and extends over the belt to help hold the belt in the sheave 36 when the belt is lose. Curved guide plate 89, extending around sheave 36, also helps in holding the belt 70 in that sheave when the belt has been loosened. Guide plate 90 mounted on arm 77 and having a depending stud 91, holds belt 70 in idler pulley 71 when the pulley is swung to loosen the belt.

When the mower is traversing level ground during normal mowing operation, as shown in FIGURE 7, the center mower section is sustained in a level attitude by the frame member 10, which is pivotally connected to the tractor, and by the front wheels 32. The wing sections are held level by the center mower section and by the outboard wheels 54. The blades of the center section and the blades of the wing sections all lie substantially in a common horizontal plane parallel to the ground.

Each wing section 50, 51 has a bracket mounted thereon, but since the brackets are similar (except of different hand) only one will be described. The bracket 95 is rigidly connected to the upper surface of the base member 52 of mower section 51 (as shown best in FIGURE 2) and terminates in two, inwardly extending, spaced apart, arms 96, 97 which straddle the shaft 67 of intermediate connecting member 61. As the mower traverses undulations on the ground, the wing sections swing up or down, as shown in FIGURE 8, and the bracket 95 swings to move the arms 96, 97 towards and away from shaft 67. As long as the arms 96, 97 are spaced from axis K and do not contact shaft 67 (which they will not generally do during normal mowing operations) the wing section 51 will pivot about axis L. Since axes I and L lie substantially in the plane of the blades, the wing section blades, although they will tilt with respect to the center section blades, will not swing toward or away from the center section blades as the wing sections tilt relative to the center section.

Until the shaft 67 is contacted by one of the arms of bracket 95, the intermediate member 61, which connects the wing section 51 to the center section 9, will not rotate, and the arms 67a and 67b will remain in the same angular position with respect to shaft 67. With the member 61 in the angular position shown in FIGURES 7 and 8, the pulley 99 (corresponding to pulley 71) will be urged by a spring (corresponding to spring 74) in a counterclockwise direction (as viewed in FIGURE 1) to hold the belt 100 (which corresponds to belt 70) taut. With belt 100 taut, the wing section blade will be power driven from the power source 35 on the central mower section.

When a wing section is swung up farther than the wing section 51 in FIGURE 8, the arm 96 of bracket 95 engages shaft 67 to arrest the bracket in axis K, and the bracket 95 serves as a bridge extending from the wing section (to which it is rigidly connected) to the pivot shaft 67 in pivot axis K to rigidly connect the wing section and the intermediate connecting member for pivotal movement as a unit above the axis K defined by shaft 67. While pivotal movement of the wing section 51 about axis L has no effect on the driving connection to the wing blades (because of the lost motion between the bracket 95 and shaft 67) the swinging of the wing section about axis K will cause the intermediate connecting member to rotate about axis K (see FIGURE 9), interrupting the driving connection to the wing section blade by loosening the belt 100. Thus, when the wing sections are raised for storage, or for transport through a narrow passage, the blades thereof will not rotate even though the center blades may continue to rotate. With this construction, the chance of injury from exposed blades is greatly reduced.

It will be noted the bracket 104 (corresponding to bracket 95), pivot shaft 62, arm 85, link 86, stud 76, arm 75, arm 78, sleeve 74, arm 77, and pulley 71 define linkage to loosen the belt 70 and thereby disengage the drive to the wing blade. This linkage, which is operable by swinging movement of the wing section, has lost motion therein (the gap between the arms of bracket 104) which prevents the disengagement of the drive until after the wing section 50 has swung a predetermined amount. As shown in FIGURE 8 the wing section 51 has been swung upwardly just far enough to take up this lost motion, and any upward swinging less than or up to the amount shown for wing section 51 in FIGURE 8 will not interfere with the driving connection from the power source to the wing blade. Any substantial further upward swinging, however, beyond the limit shown for wing section 51 in FIGURE 8, will loosen the belt 100 and interrupt the drive to the wing blade.

The bracket 95 has a pivotal latch 98 which, when the wing section is fully elevated, is urged into engagement by spring 101 with pin 102 on the center section base member. The latch can easily be released by chain 103 which is connected between the latch and the arm 53.

A shaft 105 is mounted on the base member 19 of the center section and has arms 106, 107 which are connected by chains (not shown) to lift mechanism on the tractor for lifting the center section of the mower off the ground. A cable 108 is connected at one end to bracket 95 and at the other end to an arm 109. The arm 109 is connected to shaft 105 so that when the mower section is lifted, the shaft 105 is rotated a limited amount to tighten the cable and hold the wing section 51 from excessive drooping. As can be seen in FIGURE 1, the cable 108 extends along shaft 67, through guides thereon, and over pulley 110 mounted on the base member 19 of the central mower section. A similar cable performs the same function for wing section 50.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. A mower having at least two pivotally interconnected mowing sections comprising a first mowing section having a first pivot axis, a second mowing section having a second pivot axis, means defining a bridge rigid with respect to said second mowing section after a predetermined swinging movement of said second mowing section about said second axis, said bridge extending to said first pivot axis whereby further swinging movement of said second mowing section occurs about said first axis.

2. A mower comprising
   (a) a first mower section,
   (b) a second mower section,
   (c) a connecting member pivotally connected on a first axis to said first mower section and pivotally connected on a second axis to said second mower section,
   (d) means to render said connecting member rigid with respect to said second mower section after a predetermined swinging movement of said second mower section in one direction about said second pivot axis whereby further swinging movement of said second mower section in said one direction occurs about said first pivot axis.

3. A mower having at least two pivotally interconnected mowing sections comprising a first mowing section having a shaft defining a first pivot axis, a second mowing section having a second pivot axis which permits limited unrestrained pivotal movement thereof, a bracket mounted on said second mowing section extending toward said first pivot axis, said bracket arrested by engaging said shaft after the second mowing section has swung upwardly a predetermined amount whereby further upward swinging movement of said second mowing section occurs about said first pivot axis.

4. A mower comprising
   (a) a first mower section,
   (b) a second mower section,
   (c) a connecting member pivotally connected on a first axis to said first mower section and pivotally connected on a second axis to said second mower section,
   (d) a bracket mounted on said second mower section extending toward said first pivot axis but spaced therefrom when said mower sections lie side-by-side in a horizontal plane, said bracket arrested on said first pivot axis after the second mower section has been swung upwardly about said second pivot axis a predetermined amount whereby further upward swinging movement of said second mower section occurs about said first pivot axis.

5. A mower comprising
   (a) a first mower section,
   (b) a second mower section,
   (c) a pivot shaft mounted on the first mower section to define a first pivot axis,
   (d) an arm on the pivot shaft pivotally connected to the second mower section on a second pivot axis,
   (e) a bracket mounted on said second mower section extending toward said pivot shaft but spaced therefrom when said mower sections lie side-by-side in a horizontal plane, said bracket contacting said pivot shaft after the second mower section has been moving upwardly about said second pivot axis a predetermined amount whereby further upward swinging movement of said second mower section occurs about said first pivot axis.

6. A mower according to claim 1 in which said mower sections have blades for rotation in a common plane about spaced apart axes when said mower sections are in a predetermined angular relationship, said second pivot axis lying in said common plane and extending between the axes of rotation of said blades.

7. A mower according to claim 2 in which said mower sections have blades mounted for rotation about spaced apart axes and have ground engaging members which support the mower sections with the blades in a common plane when the mower sections are on level ground, said second pivot axis lying in said common plane and extending between the axes of rotation of said blades.

8. A mower according to claim 3 in which said mower sections lie side-by-side and each has a mower blade suspended therefrom for rotation about an axis, each mower section having at least one ground engaging element to upport at least partially the mower sections with the blades in a common horizontal plane when the mower sections are on horizontal ground, said second pivot axis lying in said common plane and extending between the axes of rotation of said blades.

9. A mower according to claim 4 in which said mower sections lie side-by-side and in which each mower section has a mower blade suspended therefrom for rotation about an axis, each mower section having at least one wheel to support at least partially the mower sections with the blades in a common horizontal plane when the mower sections are on horizontal ground, said second pivot axis lying in said common plane and extending between the axes of rotation of said blades parallel to the direction of travel of the mower when the mower is moving along a straight path.

10. A mower according to claim 5 in which said mower sections lie side-by-side and in which each mower section has a mower blade suspended therefrom for rotation about an axis, said first mower section having a plurality of wheels and said second mover section having at least one outboard wheel, said wheels supporting the mower sections with the blades thereof in a common horizontal plane when the mower sections are on horizontal ground, said second pivot axis lying in said common plane and extending between the axes of rotation of said blades parallel to the direction of travel of the mower when the mower is moving along a straight path.

11. A mower according to claim 2 in which the second mower section has a blade thereon and in which the first mower section has a power source mounted thereon and in driving connection with the blade, said mower having means to interrupt the driving connection to the blade when said second mower section swings about said first axis.

12. A mower according to claim 3 in which the second mower section has a blade thereon and in which the first mower section has a power source mounted thereon, said mower having a belt connecting said power source to said blade, and said mower having means including an idler pulley to loosen the belt when said second mower section swings about said first axis.

13. A mower according to claim 4 in which the second mower section has a blade thereon and in which the first mower section has a power source mounted thereon, said mower having an idler pulley thereon and having a belt on said idler pulley connecting said power source to said blade, and means to swing said idler pulley to loosen said belt in response to swinging movement of said second mower section about said first axis.

14. A mower according to claim 5 in which the second mower section has a blade thereon and in which the first mower section has a power source mounted thereon, said first mower section having an idler pulley pivotally mounted thereon, said mower having a belt extending between said power source and said blade, said mower having means to bias the idler pulley against the belt to hold the belt taut, said pivot shaft in the mower connected to the link for rotation therewith, said pivot shaft having an arm extending therefrom and connected to the idler pulley to pivot the pulley away from the belt when said second mower section swings about said first pivot axis thereby interrupting the drive to said blade.

15. A mower comprising a first mower section, a second mower section, and a connecting member pivotally connected on a first axis to said first mower section and pivotally connected on a second axis to said second mower section, said second mower section pivoting about said second axis with respect to said first mower section up to a predetermined angle and pivoting about said first axis with respect to said first mower thereafter.

16. The mower of claim 15 in which said second mower section has a power driven rotary blade and in which power to said blade is interrupted in response to said second mower section pivoting about said first axis.

17. The mechanism of claim 16 in which said first mower section has a power driven rotary blade and the blades of said mower sections rotate about spaced apart axes, said second axis extending horizontally fore and aft between the axes of rotation of said blades and in vertical alignment with the blades.

18. A mower having a first mower section and a second mower section, said second mower section having a rotary blade and having a drive connected thereto to rotate the blade, and drive disengaging linkage having lost motion therein, said linkage operable in response to swinging movement of said second mower section with respect to said first mower section to disengage the drive after swinging a predetermined amount to take up said lost motion.

References Cited

UNITED STATES PATENTS

| 2,952,961 | 9/1960 | Engler | 56—25.4 |
| 3,070,938 | 1/1963 | Winget | 56—6 |
| 3,267,651 | 8/1966 | Engler | 56—6 |
| 2,699,025 | 1/1955 | Goss | 56—25 |
| 3,012,389 | 12/1961 | Jacobs | 56—6 |
| 3,267,652 | 8/1966 | Dahlgren et al. | 56—6 |
| 3,339,353 | 9/1967 | Schreyer | 56—6 |

RUSSELL R. KINSEY, Primary Examiner

U.S. Cl. X.R.

56—25.4